(12) United States Patent
Karadimitriou et al.

(10) Patent No.: US 6,618,717 B1
(45) Date of Patent: Sep. 9, 2003

(54) COMPUTER METHOD AND APPARATUS FOR DETERMINING CONTENT OWNER OF A WEBSITE

(75) Inventors: Kosmas Karadimitriou, Shrewsbury, MA (US); Jonathan Stern, Newton, MA (US); Michel Decary, Quebec (CA); Jeremy W. Rothman-Shore, Cambridge, MA (US)

(73) Assignee: Eliyon Technologies Corporation, Cambridge, MA (US)

( * ) Notice: Subject to any disclaimer, the term of this patent is extended or adjusted under 35 U.S.C. 154(b) by 0 days.

(21) Appl. No.: 09/704,080

(22) Filed: Nov. 1, 2000

Related U.S. Application Data
(60) Provisional application No. 60/221,720, filed on Jul. 31, 2000.

(51) Int. Cl.[7] .......................... G06F 15/18; G06F 17/00; G06N 5/04
(52) U.S. Cl. .............................. 706/61; 706/59; 706/46
(58) Field of Search ................................ 706/59, 46, 61

(56) References Cited

U.S. PATENT DOCUMENTS

| | | |
|---|---|---|
| 5,319,777 A | 6/1994 | Perez |
| 5,764,906 A | 6/1998 | Edelstein et al. |
| 5,813,006 A | 9/1998 | Polnerow et al. |
| 5,895,470 A | 4/1999 | Pirolli et al. |
| 5,918,236 A | 6/1999 | Wical |
| 5,924,090 A | 7/1999 | Krellenstein |
| 6,094,653 A | 7/2000 | Li et al. |
| 6,112,203 A | 8/2000 | Bharat et al. |
| 6,122,647 A | 9/2000 | Horowitz et al. |
| 6,253,198 B1 * | 6/2001 | Perkins ........................ 707/3 |
| 6,260,033 B1 | 7/2001 | Tatsuoka |
| 6,336,108 B1 | 1/2002 | Thiesson et al. |
| 6,418,432 B1 | 7/2002 | Cohen et al. |

FOREIGN PATENT DOCUMENTS

| | | |
|---|---|---|
| AU | A-53031-98 | 8/1998 |
| AU | A-53031/98 | 8/1998 |
| JP | 10-320315 | 12/1998 |
| WO | WO 99/67728 | 12/1999 |
| WO | WO 00/33216 | 6/2000 |

OTHER PUBLICATIONS

ABCNEWS.com, Apr. 28, 1999. http://web.archive.org/web/19990428185649/abcnews.go.com/.

COMPAQ, Apr. 22, 1999. http://web/archive.org/web/19990422222242/www.compaq.com/.

(List continued on next page.)

Primary Examiner—John Follansbee
Assistant Examiner—Joseph P. Hirl
(74) Attorney, Agent, or Firm—Hamilton, Brook, Smith and Reynolds, P.C.

(57) ABSTRACT

Computer method and apparatus identifies content owner of a Web site. A collecting step or element collects candidate names from the subject Web site. For each candidate name, a test module (or testing step) runs tests that provide quantitative/statistical evaluation of the candidate name being the content owner name of the subject Web site. The test results are combined mathematically, such as by a Bayesian network, into an indication of content owner name. The determined indications of content owner name correlated with respective Web site are stored in a database or other storage means.

27 Claims, 4 Drawing Sheets

OTHER PUBLICATIONS

Dwi H. Widyantoro, Thomas R. Ioerger, John Yen. "An Adaptive Algorithm for Learning Changes in User Interests". Nov. 1999. ACM. p. 405–412.

Soumen Chakrabarti, Byron Dom, Piotr Indyk. "Enhanced hypertext categorization using hyperlinks". 1998 ACM. pp. 307–318.

Sahami, M. et al., "SONIA: A Service for Organizing Networked Information Autonomously," *3rd ACM Conference on Digital Libraries, Digital 98 Libraries*, Jun. 23–26, 1998, pp. 200–209.

Pazzani, M. et al., "Learning from hotlists and coldlists: Towards a WWW information filtering and seeking agent," *Proc. International Conference on Tools with Aritficial Intelligence*, Los Alamitos, CA, 1994, pp. 492–495.

Lam, W. and K. Low, "Automatic Document Classification Based on Probabilistic Reasoning: Model and Performance Analysis," *1996 IEEE Conference on Computational Cybernetics and Simulation*, Orlando, FL 1997, pp. 2719–2723.

PCT International Search Report PCT/US01/22385, Dec. 18, 2002 (4 pp).

Langer, A. and J.S. Rosenschein, "Using Distributed Problem Solving to Search the Web," *Proc. 4th Int. Conf. on Autonomous Agents, ACM, USA*, Jun. 3–7, 2000, pp. 197–198.

International Search Report PCT/US01/41515, Feb. 28, 2003, 4 pp.

PCT International Search Report PCT/US01/22430, Jan. 17, 2003, 4 pp.

PCT International Search Report PCT/US01/24162, Feb. 13, 2003, 4 pp.

Ball, T. and F. Douglis, "An Internet Difference Engine and its Applications," *Proceedsings of COMPCON '96, IEEE Comp. Soc. Press*, Feb. 25, 1996, p. 71–76.

Freitag, D., "Machine Learning for Information Extraction in Informal Domains," *Machine Learning 39:2/3* (169–202), May/Jun. 2000, p. 169–202

Kjell, B., "Authorship Attribution of Text Samples Using Neural Networks and Bayesian Classifiers," *IEEE Int. Conf. on Systems, Man, and Cybernetics, vol. 2*, Oct. 5, 1994, pp. 1660–1664.

Singhal, M., "Update Transport: A New Technique for Update Synchronization in Replicated Database Systems,"*IEEE Transactions on Software Engineering 16:12* (1325–1336), Dec. 1, 1990.

Mitchell, T.M., "Bayesian Learning" in *Machine Learning*, McGraw–Hill (NY) 1997 (p. 154–200).

Domingos, P. and M. Pazzani, " On the Optimality of the Simple Bayesian Classifier under ZeroOne Loss," *Machine Learning*, vol. 29, 1997 (pp. 103–130).

Friedman, N. and M. Goldszmidt, "Building Classifiers Using Bayesian Networks," *Proceedings of the National Conference on Artificial Intelligence (AAAI 96)*, 1996 (pp. 1277–1284).

Lewis, D.D., "Naive (Bayes) at Forty: the Independence Assumption in Information Retrieval," *Proceedings 10th European Conference on Machine Learning (ECML–98)*, 1998 (p. 4–15).

International Search Report PCT/US01/22426, Mar. 17, 2003, 4 pp.

International Search Report PCT/US01/23343, Mar. 19, 2003, 4 pp.

Guan, T. and K–F Wong, "KPS: a Web information mining algorithm," *Computer Networks* 31:11–16 (1495–1507) May 17, 1999, Elsevier Science Publishers B.V., Amsterdam.

Miller, R.C. and K. Bharat, "SPHINX: a framework for creating personal, site specific Web crawlers," *Computer Networks and ISDN Systems*, 30:1–7 (119–130) Apr. 1, 1998, North Holland Publishing, Amsterdam.

Powell, T.A. et al., *HTML Programmer's Reference*, (Appendices A and B), Osborne/McGraw–Hill, 1998 (pp. 355–377).

* cited by examiner

COMPUTER METHOD AND APPARATUS FOR DETERMINING CONTENT OWNER OF A WEBSITE

RELATED APPLICATION

This application claims the benefit of Provisional Patent Application No. 60/221,720 filed Jul. 31, 2000, the entire teachings of which are incorporated herein by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet has become the venue of choice for every organization for providing pertinent, detailed and timely information about themselves, their cause, services and activities.

The Internet essentially is the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

As used herein, the following terms have the indicated definitions.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the domain directory in which the content is located, and the third contains the file that stores the content:

<protocol>: <domain> <directory> <file>

For example:

www.corex.com/bios.html
www.cardscan.com/index.html
fn.cnn.com/archives/may99/pr37.html
shiva.lin.com/soft/words.zip Commonly, the <protocol> part may be missing. In that case, modern Web browsers access the URL as if the http:// prefix was used. In addition, the <file> part may be missing. In that case, the convention calls for the file "index.html" to be fetched.

For example, the following are legal variations of the previous example URLs:

www.corex.com/bios.html
www.cardscan.com
fn.cnn.com/archives/may99/pr37.html
ftp://shiva.lin.com/soft/words.zip Web Page Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one file forms a Web page, however, there is only one file that is associated with the URL and which initiates or guides the Web page generation.

Web Browser

Web browser is a software program that allows users to access the content stored in Web sites. Modem Web browsers can also create content "on the fly", according to instructions received from a Web site. This concept is commonly referred to as "dynamic page generation". In addition, browsers can commonly send information back to the Web site, thus enabling two-way communication of the user and the Web site.

The concept of Web site is closely linked to the concept of Web domain, however they have some important differences. Web site is a more abstract term, which refers to a collection of Web pages usually put together, owned, and maintained by a single entity (which can be company, organization, institution, person, etc). Very often, a Web site resides on a particular Web domain, however there are exceptions when the content of a site is distributed among several domains. In general, every Web site has at least one domain, however the opposite is not always true (there are domains with no corresponding Web site).

In many cases a Web site can be viewed as a book where each chapter provides information about a different but related topic and where it is assumed that the reader will correlate information from one page to the other so that there is no need to repeat the same information on every page. For example, a company Web site may contain pages dedicated to the company's mission, history, products, services, management, contact information, news, etc. The company name might not even be mentioned when talking about products or its management and is assumed to be conveyed by the fact that the present/currently displayed page is part of the company Web site.

SUMMARY OF THE INVENTION

The content published in a Web site can vary considerably in both its type and format: it may be news, information, fiction, statements, etc. given as text, pictures, video, audio, graphics, etc. The Web site content owner is the legal entity (individual or institution, company, organization, etc) which publishes and is legally responsible for this content.

Identifying the content owner allows tagging the information with its source, in order to filter it, estimate its value and accuracy, or use it according to attributes associated with this source. In addition to that, very often information collected from a Web site is incomplete if the site owner is unknown. For example, in Web mining projects that automatically collect people or Organization information (see Inventions 5, 6 and 7 as disclosed in the related Provisional Application No. 60/221,750 filed on Jul. 31, 2000 for a "Computer Database Method and Apparatus") it is essential to know who is the legal entity that publishes this information. The reason is that very often, the information is given without explicitly specifying the entity that this information is about; for example, Corex Corporation publishes in its Web site a list of directors, under the simple header "Board of Directors", without explicitly specifying "Board of Directors of Corex Corporation". Human readers can deduce the implicit information, however, it is very difficult for automated computer programs to connect the information to the correct Organization name.

In addition to the above, identifying the owner of a Web site has value in itself, in composing a list of {Web domain, legal owner} pairs. There are already commercial companies that sell lists of this kind (e.g. Network Solutions Inc), however, they either create them manually, limit the list to only part of all existing Web domains, or do not update them on a regular basis to reflect frequent changes.

The main purpose of the present invention is to automatically identify the content owner of a Web site, given a set of Web pages from that site. Statistical algorithms are used to make inferences based on an array of tests and candidate strings that are extracted from the given pages. The whole process is completely automated, so that it can run without human supervision or labor. In this way, the present invention method coupled with a Web robot (see invention 4 as disclosed in the related Provisional Application No. 60/221, 750) is capable of producing the complete list of {Web domain, legal owner} for all existing domains in the Web, in a totally automated fashion.

In a preferred embodiment, a method of identifying content owner of a Web site comprises the computer-implemented steps of: (i) collecting candidate names from a subject Web site; (ii) for each candidate name, running tests having test results which enable quantitative evaluation of the candidate name being content owner name of the subject Web site; and (iii) mathematically combining the test results into an indication of content owner name.

In particular, the step of running tests includes employing tests that enable statistical evaluation of each candidate name being the content owner name. Preferably, the step of combining the test results includes using a Bayesian network. In a further step, the Bayesian network is trained using a training set of Web sites with respective known content owner names such that statistics on the test results are collected on the training set of Web sites.

The invention method may further comprise the step of providing a confidence level of the indicated content owner name.

In the preferred embodiment, the step of collecting candidate names includes using software robots, Web crawlers, Web spiders and/or agents. Further, the step of collecting candidate names includes collecting noun phrases that are capitalized and in particular have a generic term that is indicative of an organization. For example, the terms (or the abbreviations thereof) "agency", "association", "bank", "club", "company", "corporation", "council", "enterprise", "foundation", "hospital", "incorporated", "labs", "limited", "partners", "ventures" and the like are commonly used to indicate an organization. The invention collects noun phrases that include such terms and uses the collected noun phrases as candidate names.

In addition, the step of combining the test results to identify the content owner name includes determining when no said content owner name exists at the subject Web site. In that case, the step of running tests enables statistical evaluation of the candidate name being the content owner name; and the step of determining no content owner name exists at the subject Web site is based on no candidate name having a probability within a predetermined threshold. Preferably, the threshold is statistically predefined by a desired ratio of false positives to false negatives.

In accordance with the present invention, computer apparatus for identifying the content owner of a Web site comprises: means for collecting candidate names from a subject Web site; and a test module responsive to the means for collecting and including a plurality of processor-executed tests having test results which enable quantitative (e.g., statistical) evaluation of the candidate name being content owner name of the subject Web site. For each candidate name, the test module runs the tests and combines the test results into an indication of content owner name or an indication that no content owner name exists at the subject Web site.

The test module preferably employs a Bayesian network to mathematically combine the test results. A training member trains the Bayesian network using a training set of Web sites with known content owner names. The training module collects statistics on the test results from the training set of Web sites. The test module further provides a confidence level of the indicated content owner name.

The means for collecting candidate names includes software robots, Web crawlers, Web spiders and/or agents.

The method and apparatus includes storing determined indications of content owner names in a manner and means that enables cross referencing with indications of respective Web sites. To that end, a database (or similar storage means) containing indications of content owner name correlated with a respective Web site is formed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Every Web site belongs to a legal entity (individual or institution, company, organization, etc.) that is responsible for its content. Usually the content owner is obvious to a human reader, e.g. in company Web sites the company name very often appears in the home page. However, the name of the content owner does not have a standard format, position, or header, and sometimes it does not even appear in the home page at all. Furthermore, the content owner name often does not even appear in text form, but it is embedded in a picture with the company logo. Text in pictures is readable by humans, but not easily readable by computers, especially when the logo has been creatively designed. For all these reasons, it is not straightforward for a computer program to identify the content owner's name from a Web site.

Figure 2:
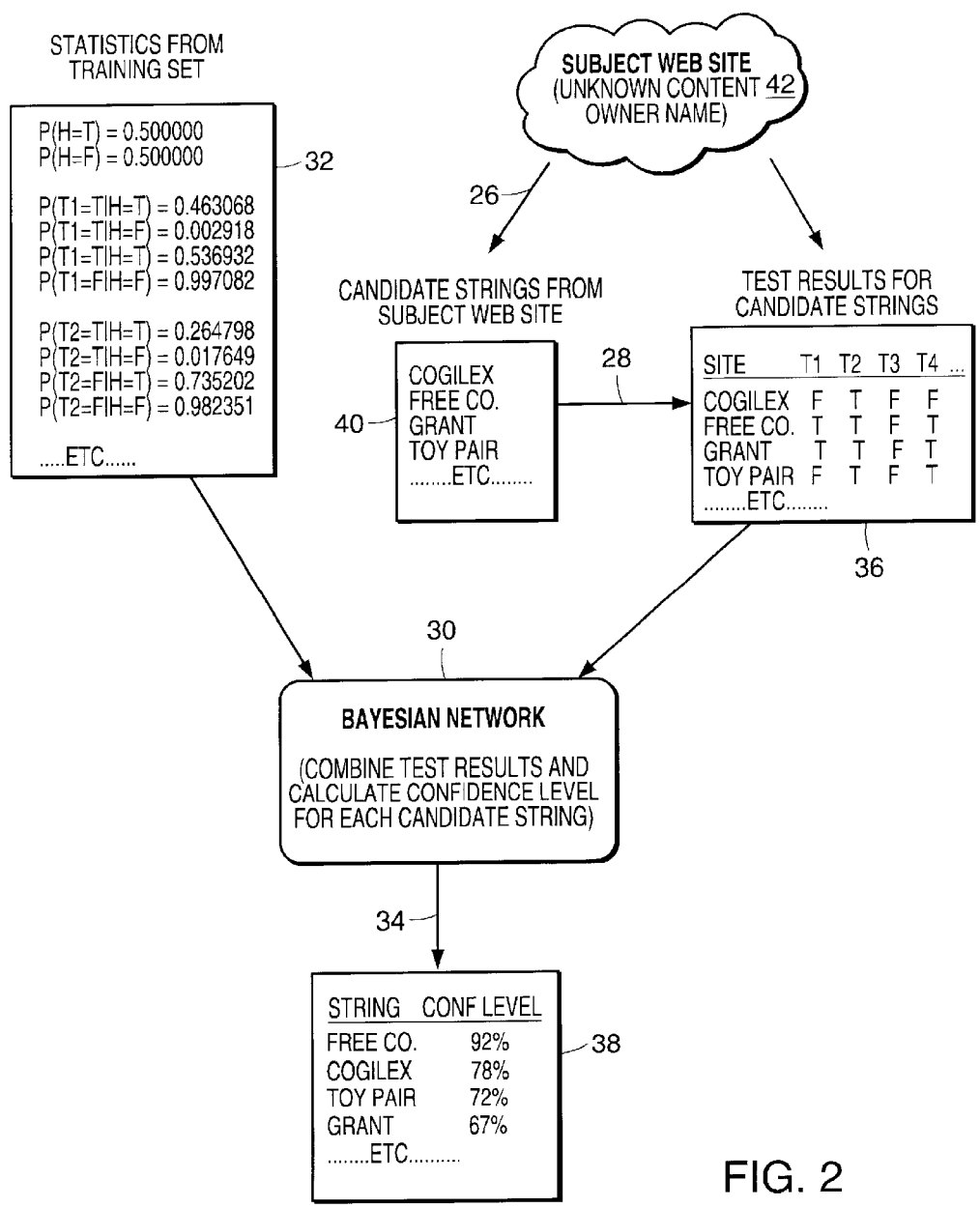
FIG. 2 is an overview of the process of combining the test statistics with the test results from a subject Web site in order to calculate the confidence level for each candidate string being the content owner's name for the subject Web site in a preferred embodiment of the invention.

The approach that the present invention employs for solving this problem involves the following steps as illustrated in FIG. 2:

a) collect 26 as many candidate names 40 as possible from the Web site b) run 28 a series of tests ($T_i$) on each candidate name 40 c) combine 30 the test results 36 of each candidate name 40 into a score d) decide 34 which one is the winning candidate name based on the scores Each test result 36 provides some evidence about whether the candidate name 40 is the Web site's 42 content owner name or not. Statistics 32 are used to quantify the amount of evidence each test result 36 provides. These statistics 32 are in the form of conditional probabilities, for example, when a candidate name returns result X from the test $T_i$, then there is 78% probability that this candidate name is the actual content owner name.

Figure 1:
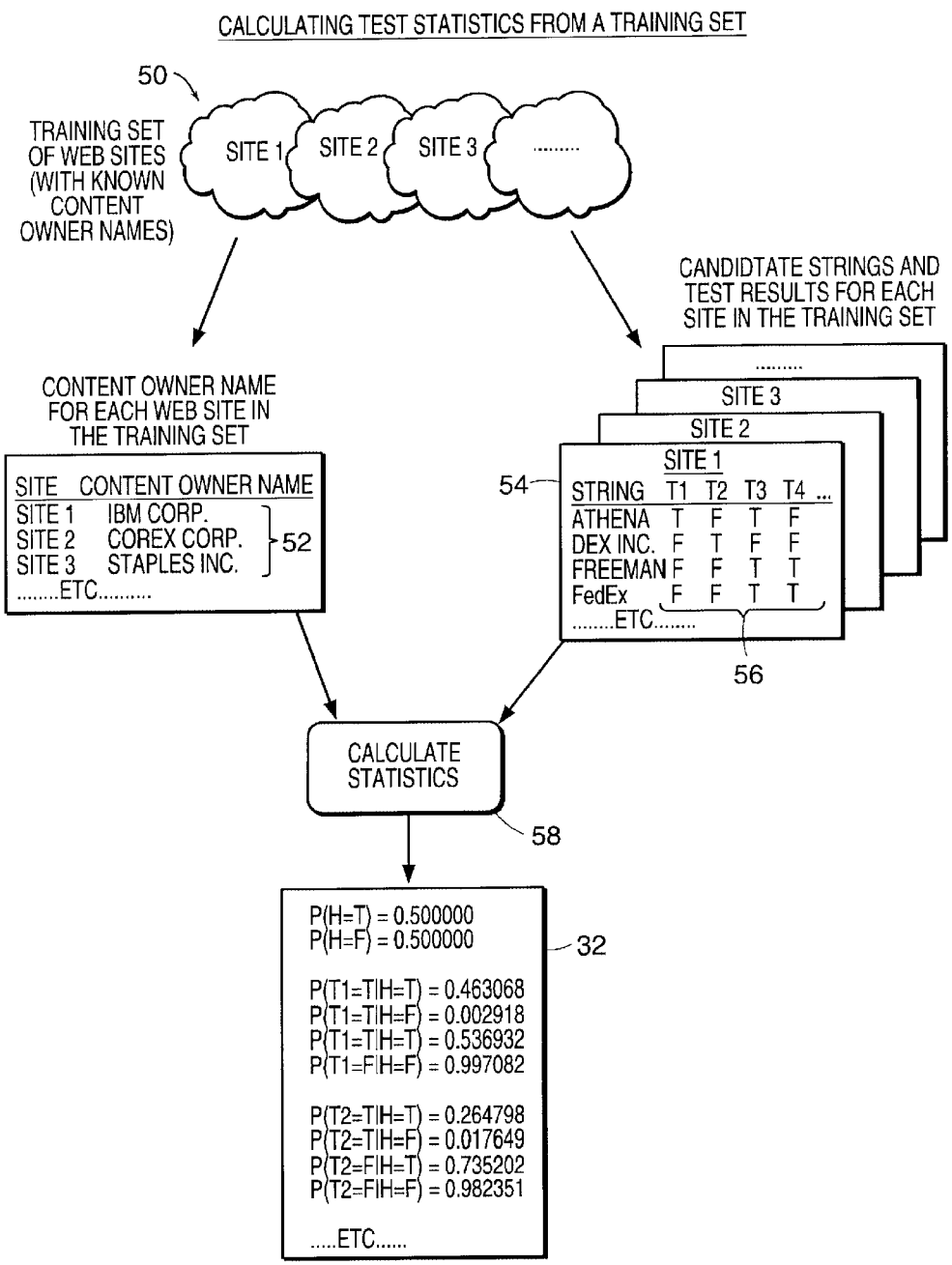
FIG. 1 is an overview of the process employed by the present invention for calculating test statistics from a training set of Web sites with known content owner names.

As illustrated in FIG. 1 and further discussed later, the statistics 32 used in quantifying the evidence have been calculated during a "training phase" from a suitable training sample 50. In order to combine the evidence (test results 36), the preferred embodiment of the present invention uses a Bayesian Network 30, however, other decision making, pattern recognition, or classification techniques can also be used (e.g. decision tree, neural network, rule-based expert system, etc).

Figure 3:
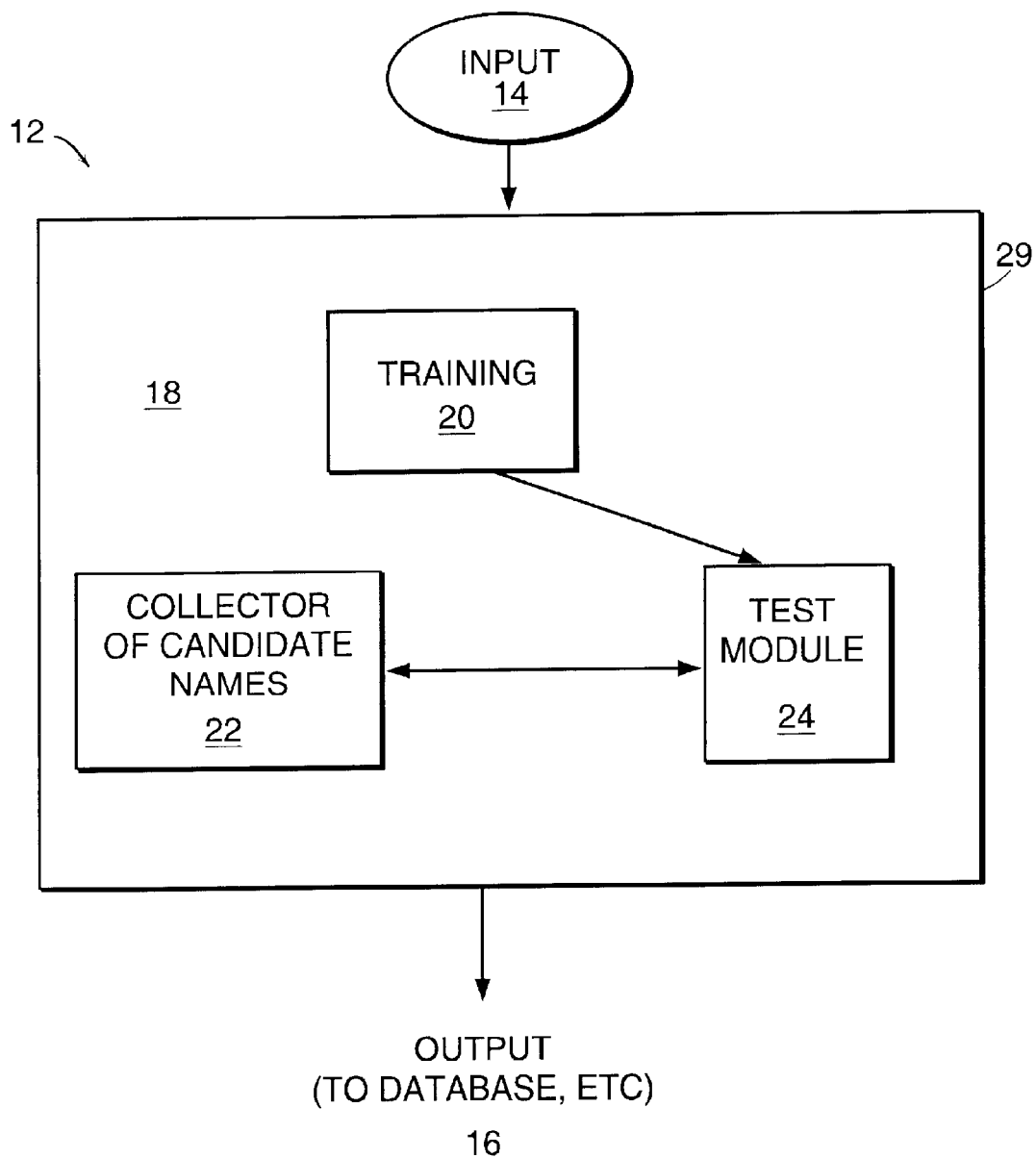
FIG. 3 is a block diagram of a preferred computer embodiment of the present invention.

Illustrated in FIG. 3 is a computer system 12 for implementing the present invention. A digital processor 29 receives input at 14 from input devices (e.g., keyboard, mouse, etc.), a software program, another computer (e.g., over a communications line, the Internet, within an intranet, etc.) and the like. The digital processor provides as output, indications of content owner names at 16 to output devices (e.g., a display monitor, printer, etc.), software program, another computer (coupled to processor 29 across a communications link) and the like. In the preferred embodiment, the content owner names determined by computer system 12 for respective Web sites are output to a database system for storage therein. In particular, the database receives and stores the indications of owner names correlated to (or in a cross-referenced manner with) indications of respective Web sites. As such, a database or index of Web sites and corresponding content owner names is formed by the present invention method and apparatus.

Figure 4:
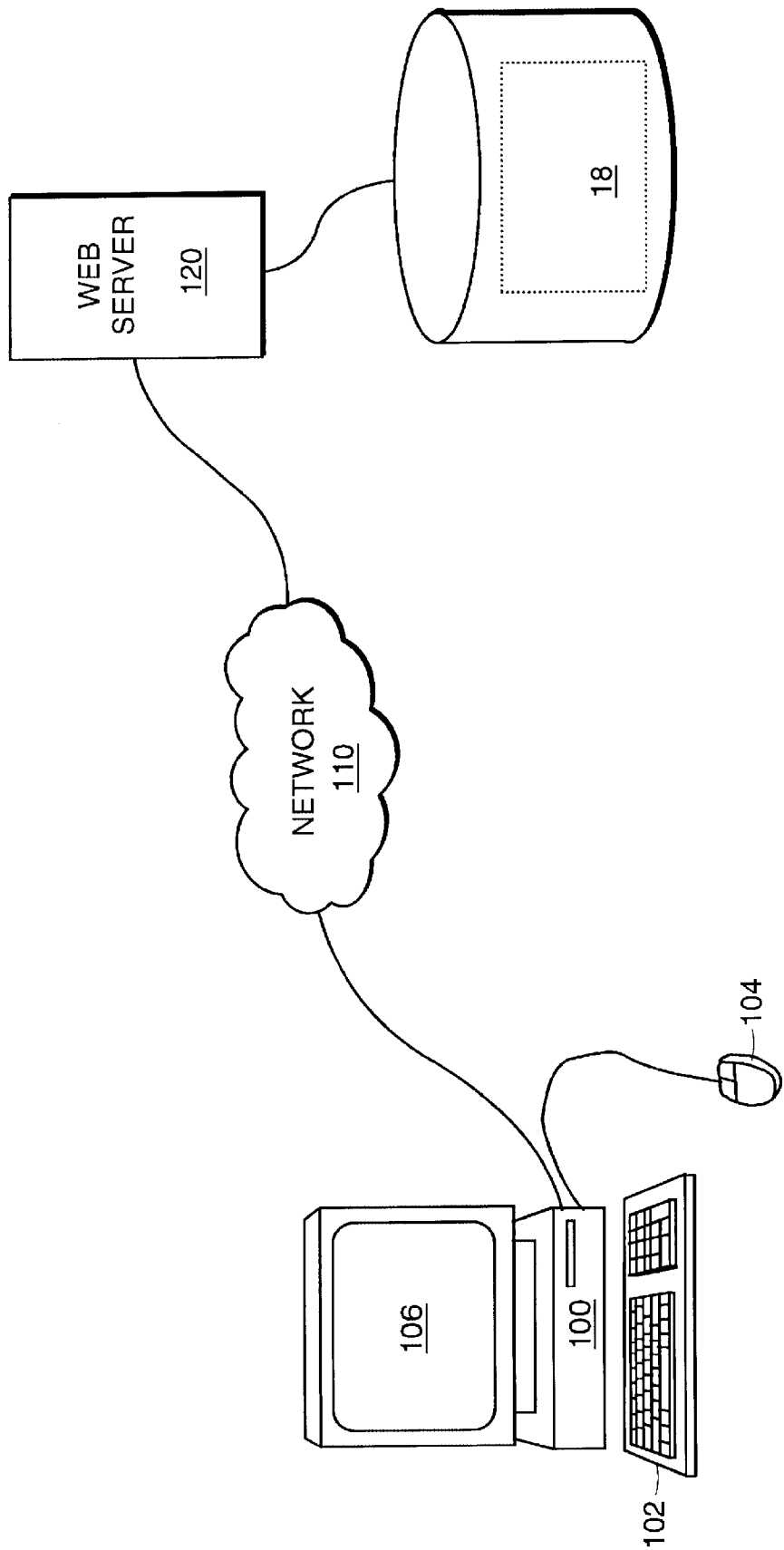
FIG. 4 is a schematic overview of a computer network environment for deploying the software embodiment of FIG. 3.

In FIG. 4 computer 100 is connected to a keyboard 102 and mouse 104 for receiving input and a display 106 for presentation of content. Computer 100 is also linked to a network 110 having access to Web server 120. The invention software 18 can be stored on disk and loaded into memory to be executed by a processor on a variety of computers, including computer 100 and Web server 120.

Network 110 can be part of the Internet, the worldwide collection of computers, networks and gateways that use the TCP/IP suite of protocols to communicate with one another. The Internet provides a backbone of high-speed data communication lines between major nodes and host computers, consisting of thousands of commercial, government, educational, and other computer systems, that route data and messages. Web server 120 is connected to the network 110 and can host computer software 18 of the present invention.

Returning to FIG. 3, in working memory, digital processor 29 stores and executes the invention program or software routine 18 which is formed of a training member 20, a candidate name collector 22 and a test module 24. The collector 22 performs step a) above, while the test module 24 performs steps b) through d) above with the support of training member 20. Specifically, training member 20 calculates test statistics 32 of the tests $T_i$ of step b) above, as applied to training set 50 of Web sites with known content owner names. These test statistics 32 provide quantitative measures of the significance of each possible test result in the process of identifying the Web site's content owner name. Each of these program elements 20, 22, 24 are further discussed below in conjunction with FIGS. 1 and 2.

In order for the collector 22 (in step a) above) to collect all candidate names for the Web site's 42 content owner, a set of fairly loose criteria is used. These mainly involve collecting every noun phrase (succession of nouns and adjectives) that is capitalized, and/or contains some keywords, such as "Inc", "Corporation", "Association", etc. Thus, collector 22 collects as candidate names 40 (in FIG. 2) noun phrases having a generic term that is indicative of an entity or organization, for example, noun phrases having the term "agency", "association"/"associates", "bank", "club", "company", "corporation", "council", "enterprise", "foundation", "group", "hospital", "incorporated", "labs"/ "laboratories", "limited", "partners", "venture", etc. For example, some of the candidate names collected from Corex Corporation's Web site are the following:

Arcadias Street
Area Code Fix
Area Code Fix Software
Arnold Industries
Allied Corp.
Atlanta Business Chronicle
... etc ...

In this step 26 (step a above) the invention method does not impose any strict criteria, so as not to lose any candidate name 40. The subsequent tests T (of step b) above) "filter out" any obviously bad candidates as discussed next.

In step b) above (at 28 in FIG. 2), the test module 24 runs a set of tests Ti on each candidate name 40 collected by collector 22, and records the results 36 of the tests. Each test offers some evidence about whether the candidate name 40 is the name of the content owner of the subject Web site 42 or not. These tests $T_i$ may include the following:

determining whether the candidate name appears in the home page title determining whether the candidate name alias appears in the homepage title (the term "candidate name alias" refers to a sub-string, acronym, abbreviation or similar form of the candidate name, e.g. "Corex", "Corex Tech.", "CorTech", "Corex Tech. Corp.", or "CTC" are all aliases of "Corex Technologies Corporation")

determining whether the candidate name contains a strong organization keyword (e.g. Inc., Corporation, Company, Ltd, etc)

determining whether the candidate name contains a weak organization keyword (e.g. Systems, Business, International, etc)

determining whether the candidate name is in a copyright notice of the Web site determining whether the candidate name has at least one non-dictionary word determining whether the candidate name appears above an address determining whether the candidate name appears as the first noun phrase of a press release (the term "noun phrase" refers to any succession of nouns and adjectives, e.g. "study guide book", "press release", "rapid software development")

determining whether the candidate name appears as the object of a meaningful verb (e.g., served, worked, founded or other biography-related verb) in a biographic sentence (e.g. Mr. Jones joined <candidate name>)

determining whether the candidate name alias appears as the object of a meaningful verb in a biographic sentence determining whether the candidate name or some abbreviation, acronym or the like form of the candidate name is contained in the Web site's domain URL determining whether the candidate name appears in three or more Web pages in the site, excluding copyright sections determining whether the candidate name alias appears in three or more Web pages in the subject Web site, including copyright sections determining whether the candidate name is found as the first noun phrase of a paragraph determining whether the candidate name alias is found as the first noun phrase of a paragraph determining whether the candidate name is found among the keywords contained in the home page's html code "META" tag determining whether the candidate name is found in a legal statement about the Web site (excluding the copyright section)

determining whether the candidate name is found in the "investor relations" Web page of the site ... etc ...

Referring now to FIG. 1, in order to assign a "degree of evidence" on every test outcome, a training set 50 of many hundred Web sites $S_i$ is used. In this training set 50, the correct content owner's name 52 for each sample Web site $S_i$ is known. Candidate strings 54 are collected from each site $S_i$ and the tests $T_i$ are run on each candidate string 54. Then, at 58 (FIG. 1) probabilities are calculated that connect the test outcomes 56 with the given hypotheses, that is, P(Test|Hypothesis) which is the probability of the particular test result given the particular hypothesis. The following is an example:

Test: candidate appears in the home page title

Hypothesis: candidate is the Web site content owner's name

P(Test=True|Hypothesis=True)=0.460870
P(Test=True|Hypothesis=False)=0.002936
P(Test=False|Hypothesis=True)=0.539130
P(Test=False|Hypothesis=False)=0.997064

These probabilities quantify the "degree of evidence" that any potential test outcome 56 provides. Note that an alternative way to represent this is by using the probability P(Hypothesis|Test), which however simply rearranges the terms in the calculations without changing the final results.

Returning to FIG. 2, Bayesian Networks have emerged during the last decade as a powerful decision-making technique. A Bayesian Network is a statistical algorithm that combines the outcome of several tests in order to chain probabilities and produce an optimal decision based on the given test results.

Bayesian Networks come in many forms, however their basic building block is Bayes' theorem:

$$P(A|B) = P(A) \cdot \frac{P(B|A)}{P(B)}$$

One of the simplest types of Bayesian Networks is the Naïve Bayesian Network. The Naïve Bayesian Network is based on the assumption that the tests are conditionally independent which simplifies considerably the calculations. In Naïve Bayesian Networks, the formula that calculates the probability for some hypothesis given some test results is the following:

$$P(H_i|T_1, T_2, \ldots T_N) = \frac{F_i}{F_1 + F_2 + \ldots + F_i + \ldots + F_K}$$

where:

$F_i P(H_i) \cdot P(T_i|H_i) \cdot P(T_2|H_i) \cdot \ldots \cdot P(T_N|H_i)$ $H_1 H_2, \ldots, H_K$ are all possible values of the hypothesis $T_1, T_2, \ldots T_N$ are the test results from tests $1, 2, \ldots, N$ respectively The above formula and the test results 36 for some candidate 40 are used to calculate the probability (confidence level 38) that the candidate name 40 satisfies each hypothesis (in the present invention, the hypothesis for each candidate name 40 has two values "True, the candidate string is the Web site's 42 content owner name" and "False, it is not"). Having a probability/confidence level 58 assigned to each candidate name 40, it is straightforward then to choose the candidate name 40 with the highest probability of being the Web site's 42 content owner name.

A threshold value for the probabilities/confidence level 38 is also useful to detect sites for which no name can be found, e.g. if no candidate name 40 was assigned probability higher than 0.80, then one can conclude that the real content owner's name does not exist in the Web site 42. The threshold level can be calculated statistically based on the desired ratio of false positives and false negatives (false positives are cases that this invention produces a name but the Web site does not actually contain the content owner's name; false negatives are cases that the invention produces no name even though the content owner's name appears in the Web site).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of identifying content owner of a Web site comprising the computer-implemented steps of:
   collecting candidate names from a subject Web site;
   for each candidate name, running tests having test results which enable quantitative evaluation of the candidate name being content owner name of the subject Web site;
   providing quantitative measures of statistical significance of test results of the tests; and
   using the quantitative measures of statistical significance, mathematically combining the test results into an indication of content owner name.

2. A method as claimed in claim 1 wherein the step of running tests includes employing tests that enable statistical evaluation of each candidate name being the content owner name.

3. A method as claimed in claim 2 wherein the step of combining the test results includes using a Bayesian network.

4. A method as claimed in claim 3 further comprising the step of training the Bayesian network using a training set of Web sites with respective known content owner names such that statistics on the test results are collected on the training set of Web sites.

5. A method as claimed in claim 1 further comprising the step of providing a confidence level of the indicated content owner name.

6. A method as claimed in claim 1 wherein the step of collecting candidate names includes using one of software robots, Web crawlers, Web spiders and agents.

7. A method as claimed in claim 1 wherein the step of collecting candidate names includes collecting noun phrases that are capitalized.

8. A method as claimed in claim 7 wherein the step of collecting noun phrases includes collecting noun phrases having a generic term that is indicative of an organization.

9. A method as claimed in claim 1 wherein the step of running tests includes at least one of the following:
   determining whether some form or part of the candidate name appears in the home page title;
   determining whether the candidate name includes a generic term indicative of an organization name, the generic term being uncommonly used outside of organization names;
   determining whether the candidate name includes a generic term indicative of an organization name, the generic term being commonly used outside of organization names;
   determining whether the candidate name is found in a copyright notice;
   determining whether the candidate name has at least one non-dictionary word;
   determining whether the candidate name appears above an address;
   determining whether the candidate name appears as the first noun phrase of a press release;
   determining whether some form or part of the candidate name appears as the object of a biography-related verb in a biographic sentence;
   determining whether the candidate name or some abbreviation of the candidate name is contained in the Web site domain URL;
   determining whether some form or part of the candidate name appears in three or more Web pages in the subject Web site;
   determining whether some form or part of the candidate name is found as the first noun phrase of a paragraph;
   determining whether the candidate name is found among key words contained in the home page's HTML code metatag;
   determining whether the candidate name is found in a legal statement about the subject Web site excluding copyright section; and
   determining whether the candidate name is found in an investor relations Web page of the subject Web site.

10. A method as claimed in claim 1 wherein the step of combining the test results to identify the content owner name includes determining when no said content owner name exists at the subject Web site.

11. A method as claimed in claim 10 wherein the step of running tests enables statistical evaluation of the candidate name being the content owner name; and
    the step of determining no content owner name exists at the subject Web site is based on no candidate name having a probability within a predetermined threshold.

12. A method as claimed in claim 11 wherein the threshold is statistically predefined by a ratio of false positives to false negatives.

13. A method as claimed in claim 1 further comprising the step of storing the indication of content owner name in a means for correlating Web site with content owner name.

14. In a digital processor, computer apparatus for identifying the content owner of a Web site comprising:
    means for collecting candidate names from a subject Web site; and
    a test module responsive to the means for collecting and including a plurality of processor-executed tests having test results which enable quantitative evaluation of a candidate name being content owner name of the subject Web site, for each candidate name the test module (i) running the tests, and (ii) using quantitative measures of statistical significance of test results, combining the test results into an indication of content owner name.

15. Apparatus as claimed in claim 14 wherein the processor executed tests include tests that enable statistical evaluation of each candidate name being the content owner name.

16. Apparatus as claimed in claim 15 wherein the test module combines the test results using a Bayesian network.

17. Apparatus as claimed in claim 16 further comprising a training member for training the Bayesian network using a training set of Web sites with respective known content owner names such that statistics on the test results are collected on the training set of Web sites.

18. Apparatus as claimed in claim 14 wherein the test module further provides a confidence level of the indicated content owner name.

19. Apparatus as claimed in claim 14 wherein the means for collecting candidate names includes one of software robots, Web crawlers, Web spiders and agents.

20. Apparatus as claimed in claim 14 wherein the means for collecting candidate names collects from the subject Web site noun phrases that are capitalized.

21. Apparatus as claimed in claim 20 wherein the means for collecting collects noun phrases having a generic term that is indicative of an organization.

22. Apparatus as claimed in claim 14 wherein the processor-executed tests of the test module includes at least one of the following:
    determining whether some form or part of the candidate name appears in the home page title;

determining whether the candidate name includes a generic term indicative of an organization name, the generic term being uncommonly used outside of organization names;

determining whether the candidate name includes a generic term indicative of organization name, the generic term being commonly used outside of organization names;

determining whether the candidate name is found in a copyright notice;

determining whether the candidate name has at least one non-dictionary word;

determining whether the candidate name appears above an address;

determining whether the candidate name appears as the first noun phrase of a press release;

determining whether some form or part of the candidate name appears as the object of a biography-related verb in a biographic sentence;

determining whether the candidate name or some abbreviation of the candidate name is contained in the Web site domain URL;

determining whether some form or part of the candidate name appears in three or more Web pages in the subject Web site;

determining-whether some form or part of the candidate name is found as the first noun phrase of a paragraph;

determining whether the candidate name is found among key words contained in the home page's HTML code metatag;

determining whether the candidate name is found in a legal statement about the subject Web site excluding copyright section; and determining whether the candidate name is found in an investor relations Web page of the subject Web site.

23. Apparatus as claimed in claim 14 wherein the test module further determines when no said content owner name exists at the subject Web site.

24. Apparatus as claimed in claim 23 wherein the processor-executed tests of the test module enable statistical evaluation of the candidate name being the content owner name; and the test module determines no content owner name exists at the subject Web site based on no candidate name having a probability within a predetermined threshold.

25. Apparatus as claimed in claim 24 wherein the threshold is statistically predefined by a ratio of false positives to false negatives.

26. Apparatus as claimed in claim 14 further comprising storage means for receiving from the test module and holding indications of content owner names and indications of Web sites, such that the storage means provides a cross reference between a Web site and its respective content owner name as determined by the test module.

27. A computer-implemented data set stored on a recordal media correlating content owner name with Web site, formed by the process of:

collecting candidate names from a subject Web site;

for each candidate name, running tests having test results which enable quantitative evaluation of the candidate name being content owner name of the subject Web site;

providing quantitative measures of statistical significance of test results of the tests;

using the quantitative measures of statistical significance, mathematically storing the indication of content owner name in a means for correlating Web site with content owner name.

\* \* \* \* \*

UNITED STATES PATENT AND TRADEMARK OFFICE
CERTIFICATE OF CORRECTION

PATENT NO. : 6,618,717 B1
DATED : September 9, 2003
INVENTOR(S) : Kosmas Karadimitriou et al.

It is certified that error appears in the above-identified patent and that said Letters Patent is hereby corrected as shown below:

Column 12,
Line 33, after "mathematically" insert -- combining the test results into an indication of content owner name; and --.

Signed and Sealed this

Sixth Day of January, 2004

JAMES E. ROGAN
*Director of the United States Patent and Trademark Office*